No. 779,077. PATENTED JAN. 3, 1905.
W. GIHON.
SPINDLE.
APPLICATION FILED MAR. 26, 1904.
Fig. 1.
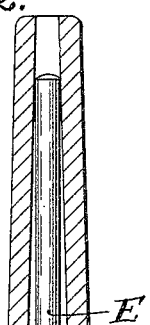
Fig. 2.
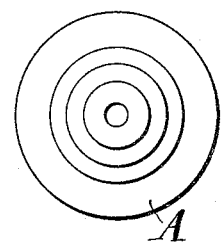
Fig. 3.
Fig. 4.
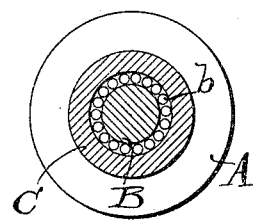
Fig. 5.
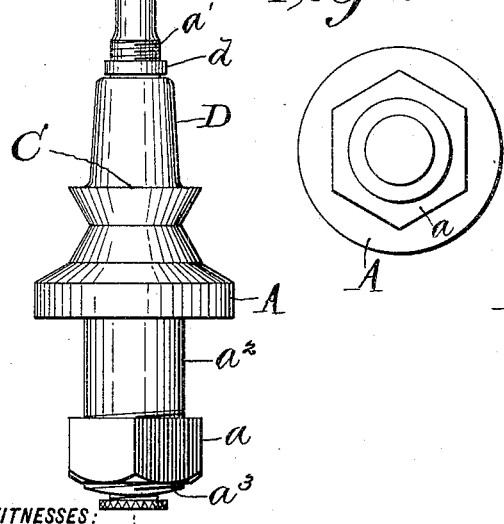
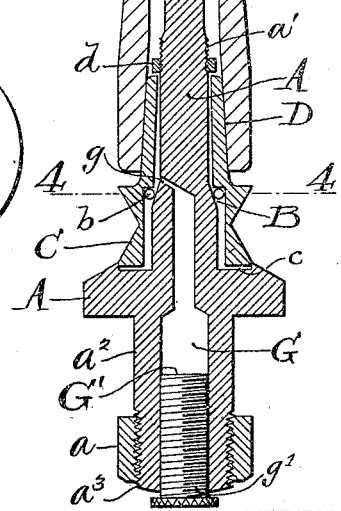
WITNESSES:
W. W. Canby
M. M. Hamilton
INVENTOR
William Gihon
BY
Harding & Harding
ATTORNEYS No. 779,077.

Patented January 3, 1905.

UNITED STATES PATENT OFFICE.

WILLIAM GIHON, OF CHICOPEE, MASSACHUSETTS, ASSIGNOR OF ONE-HALF TO MORRIS L. BAYARD, OF WOODBINE, NEW JERSEY.

SPINDLE.

SPECIFICATION forming part of Letters Patent No. 779,077, dated January 3, 1905.

Application filed March 26, 1904. Serial No. 200,137.

*To all whom it may concern:*

Be it known that I, WILLIAM GIHON, a citizen of the United States, residing at Chicopee, county of Hampden, and State of Massachusetts, have invented a new and useful Improvement in Spindles, of which the following is a full, clear, and exact description, reference being had to the accompanying drawings, which form a part of this specification.

My invention has for its object the production of a spindle which shall be universal in its application, being capable of use not only with bobbins or spools, but for all purposes for which spindles are used, whether for spinning, twisting, or winding, and with all kinds of yarns or threads.

I will first describe the embodiment of my invention as illustrated in the accompanying drawings and then point out the invention in the claims.

In the drawings, Figure 1 is a side view of my spindle. Fig. 2 is a sectional view taken on line 2 2 of Fig. 1 with a bobbin shown on it. Fig. 3 is a top view of Fig. 2. Fig. 4 is a sectional view taken on line 4 4, Fig. 2. Fig. 5 is a bottom view of my spindle.

A is the base of my new spindle, which is threaded on its lower portion $a^3$. The lower portion is made of size to fit in the orifice in the frame (not shown) and is secured therein by means of a nut $a$, acting on said threaded portion. Upon this base A is a cone-bearing B, on which revolves the whirl C. This whirl has a hollow interior cup-surface, between which and the bearing B are placed the balls $b$, the whirl being supported only by the balls $b$. Projecting from and integral with the whirl and surrounding the base A is a bearing D. The whirl C and its bearing D are prevented from moving upward vertically on the bearing A by the washer $d$, which is internally threaded and works on a threaded portion $a'$, formed at that point on the base A. The upper portion of the base A is provided with a threaded portion $a^4$, and in the end of the upper portion is formed a cup-bearing $e$, in which rests the pointed end $e'$ of the spindle-blade E. The spindle-blade is thus capable of moving in this bearing $e$ on the pointed end $e'$ to accommodate itself to the conditions hereinafter specifically described. There is thus formed for the spindle-blade a center bearing, allowing it to vary its angular position. This spindle-blade E is prevented from falling out of this bearing by means of the sleeve F, which surrounds it, and by means of the threaded interior end $f$ meshes with the threaded portion $a^2$ at the upper end of the base. The sleeve F is of slightly larger internal diameter than the exterior diameter of the spindle-blade, so that the spindle-blade may vary its center of rotation within the limits of this sleeve. In order to provide for oiling the bearing upon which the whirl C revolves, I provide a passage G, extending from the lower end of the base and communicating by passages $g$ with this bearing. In this passage I preferably place some solid lubricating material, such as vaseline, and by means of the plunger G', acted on by the screw $g'$, I am enabled to force the vaseline or other lubricating material onto the bearing.

Where my new spindle is used with bobbins, the following is the mode of operation: The bobbin H as now constructed and in ordinary use is of somewhat larger internal diameter at its bottom than at its top, and it is only necessary that the size or diameter of the bearing connected to the whirl should be of size proper to make a frictional fit with the lower internal portion of the bobbin and the diameter of the spindle-blade of such size as to make frictional contact with the upper internal portion of the bobbin.

The bobbin being placed upon my spindle and making frictional contact, as just described, and the whirl being rotated by means of a cord or band in the ordinary manner, the bobbin will be revolved and will always maintain, top and bottom, a coincident center of rotation, due to the practically rigid connection between the whirl-bearing and the spindle-blade, and the capacity of the spindle-blade to move on its point-bearing to accommodate itself to any tendency to change the centers of rotation and to maintain coincident the centers of rotation of the blade and whirl.

When my spindle is to be used with spools, the rotation not being as rapid as with bobbins, I can maintain the center of revolution true by the support which the spool will have upon the whirl-bearing and upon the sleeve F, which connects the spindle-blade with the base, although the size of the spool may be too great for it to contact with the spindle-blade.

As may be seen from the foregoing description, my new spindle is of extremely simple construction and is of universal application and will always maintain either with spindle or with bobbins the coincident center of rotation throughout the whole bobbin or spool.

As may be seen, speaking generally, this is accomplished by having the whirl and spindle-blade formed independently of each other and supported upon independent bearings and so supporting the spindle-blade that it is able to accommodate itself to any tendency to change the coincidence of its center of rotation with that of the whirl and to maintain the centers of rotation coincident. Preferably the spindle-blade should be supported on a loose point-bearing. Further, means are provided while these two—the whirl and blade—are on independent bearings and while the spindle-blade is capable of varying its angular position on its bearing that neither the spindle-blade nor the whirl and its bearing are able to move vertically upon the base. Thus the bobbin or spool may be removed and replaced without affecting the bobbin or whirl or without need of extraneous devices.

In order to prevent the whirl being moved from its seat by dirt, dust, or threads, I provide a groove $c$ in the bearing, in which the lower end or edge of the whirl rests, so that its lower edge is below the upper edge of the bearing, and thus prevents any dust, dirt, or threads passing under the whirl.

Having now fully described my invention, what I claim, and desire to protect by Letters Patent, is—

1. In a spinning-spindle, in combination, a whirl, a spindle-blade, said whirl and blade being independent of each other, and independent bearings for said whirl and spindle-blade, one of said parts being supported so as to allow its angular position upon its bearing to vary.

2. In a spinning-spindle, in combination, a whirl, having a bearing secured thereto, a spindle-blade, said whirl and blade being independent of each other, and independent bearings for said whirl and spindle-blade, one of said parts being supported so as to allow its angular position upon its bearing to vary.

3. In a spinning-spindle, in combination, a whirl, a spindle-blade, said whirl and blade being independent of each other, and independent bearings for said whirl and spindle, the spindle-blade being supported upon its bearing so as to allow its angular position to vary.

4. In a spinning-spindle, in combination, a whirl, a spindle-blade, said whirl and blade being independent of each other, and independent bearings for said whirl and spindle-blade, the spindle-blade bearing being a center bearing, and means to limit the angular movement of the spindle-blade.

5. In a spinning-spindle, in combination, a base, a whirl, carrying a bearing, said whirl surrounding said base, a bearing on said base for said whirl, a center bearing, a spindle-blade independent of said whirl supported in said center bearing so as to allow its angular position to vary.

6. In a spinning-spindle, in combination, a base, a whirl, carrying a bearing, said whirl surrounding said base, a bearing on said base for said whirl, a center bearing, a spindle-blade independent of said whirl supported in said center bearing so as to allow its angular position to vary, and means to limit the angular movement of said blade on its bearing.

7. In a spinning-spindle, in combination, a base, a whirl, carrying a bearing, said whirl surrounding said base, a bearing on said base for said whirl, a center bearing, a spindle-blade independent of said whirl supported in said center bearing so as to allow its angular position to vary, a sleeve removably secured to said bearing and surrounding said spindle-blade to limit its angular movement.

8. In a spinning-spindle, in combination, a base, a whirl, carrying a bearing, said whirl surrounding said base, a bearing on said base for said whirl, a center bearing, a spindle-blade, independent of said whirl, supported in said center bearing so as to allow its angular position to vary, said spindle-blade having a pointed end supported in said bearing.

9. In a spinning-spindle, in combination, a base, a whirl, carrying a bearing, said whirl surrounding said base, a bearing on said base for said whirl, a center bearing in said base, a spindle-blade independent of said whirl supported in said center bearing, so as to allow its angular position to vary, and means to hold the spindle-blade and whirl from vertical movement.

In testimony of which invention I have hereunto set my hand at Philadelphia on this 10th day of March, 1904.

WILLIAM GIHON.

Witnesses:
M. M. HAMILTON,
WILLIAM B. MARKS.